(12) United States Patent
Kobaslija et al.

(10) Patent No.: US 10,995,107 B2
(45) Date of Patent: *May 4, 2021

(54) ORGANOSILANE TEMPLATES AND METHODS FOR THE SYNTHESIS OF MESOPOROUS ZEOLITES

(71) Applicant: Saudi Arabian Oil Company, Dhahran (SA)

(72) Inventors: Sarah Lihoa Kobaslija, Arlington, MA (US); Jeremy Thomas O'Brien, Cambridge, MA (US)

(73) Assignee: Saudi Arabian Oil Company, Dhahran (SA)

( * ) Notice: Subject to any disclaimer, the term of this patent is extended or adjusted under 35 U.S.C. 154(b) by 242 days.

This patent is subject to a terminal disclaimer.

(21) Appl. No.: 16/102,027

(22) Filed: Aug. 13, 2018

(65) Prior Publication Data

US 2020/0048103 A1 Feb. 13, 2020

(51) Int. Cl.
*C01B 39/48* (2006.01)
*C07F 7/18* (2006.01)
(Continued)

(52) U.S. Cl.
CPC ............ *C07F 7/1892* (2013.01); *C01B 39/48* (2013.01); *B01J 29/041* (2013.01);
(Continued)

(58) Field of Classification Search
CPC ..... C01B 39/48; B01J 29/041; B01J 29/7007; C01P 2006/17; C07F 7/1892
See application file for complete search history.

(56) References Cited

U.S. PATENT DOCUMENTS 7,785,563 B2 * 8/2010 Ryoo ..................... C01B 39/40
423/703
2016/0137517 A1 5/2016 Nicolas et al.
2017/0073557 A1 3/2017 Kageyama et al.

FOREIGN PATENT DOCUMENTS

EP 1679286 A1 7/2006
IN 730/DEL/2011 A 10/2012
(Continued)

OTHER PUBLICATIONS

"Verified Synthesis of Zeolitic Materials", Second Revised Edition, Robson et al, 2001 (Year: 2001).*
(Continued)

*Primary Examiner* — David M Brunsman
(74) *Attorney, Agent, or Firm* — Dinsmore & Shohl LLP (57) ABSTRACT

Methods of forming mesoporous zeolites with tunable pore widths are provided. In some embodiments, the method includes mixing a silicon-containing material, an aluminum-containing material, and at least a quaternary amine to produce a zeolite precursor solution. The zeolite precursor solution is pre-crystallized at a pre-crystallization temperature of greater than 125° C. and autogenous pressure to form a pre-crystallized zeolite precursor solution and combined with an organosilane mesopore template to produce a zeolite precursor gel. The zeolite precursor gel is crystallized without a previous discrete functionalization step to produce a crystalline zeolite intermediate and the crystalline zeolite intermediate is calcined to produce the mesoporous zeolite. An organosilane mesopore template in accordance with
(Continued)

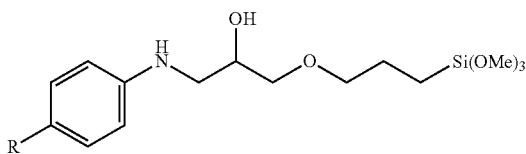

is also provided, where R is an aliphatic, aromatic, or heteroatom-containing group.

12 Claims, 6 Drawing Sheets

(51) Int. Cl.
    *C01B 39/04*     (2006.01)
    *C01B 39/46*     (2006.01)
    *B01J 29/04*     (2006.01)
    *B01J 29/70*     (2006.01)

(52) U.S. Cl.
    CPC ........... *B01J 29/7007* (2013.01); *C01B 39/04* (2013.01); *C01B 39/46* (2013.01); *C01P 2006/17* (2013.01)

(56) References Cited

FOREIGN PATENT DOCUMENTS

WO     2014014612 A1     1/2014
WO     2016140315 A1     9/2016

OTHER PUBLICATIONS

Serrano et al., "Hierarchical Zeolites with Enhanced Textural and Catalytic Properties Synthesized from Organofunctionlized Seeds", Chem. Mater (2006) pp. 2462-2464.
Serrano et al., "Hierarchical ZSM-5 zeolites synthesized by silanization of protozeolitic units: Mediating the mesoporosity contribution by changing the organosilane type", Catalysis Today (2014) pp. 15-25.
Yan et al., "Silanization-Based Zeolite Crystalization: Participation Degree and Pathway", Chem Eur. J. (2015) pp. 12161-12170.
International Search Report and Written Opinion dated Jun. 18, 2019 pertaining to International application No. PCT/US2019/029649 filed Apr. 29, 2019, 17 pgs).
García-Muñoz, Rafael A. et al., "Remarkable catalytic properties of hierarchical zeolite-Beta in epoxide rearrangement reactions" Catalysis Today, Oct. 23, 2014, pp. 141-152, vol. 243.
Choi, Minkee et al., "Amphiphilic organosilane-directed synthesis of crystalline zeolite with tunable mesoporosity" Nature Materials, Sep. 1, 2006, pp. 718-723, vol. 5, No. 9.
Moller, Karin et al., "Mesoporosity—a new dimension for zeolites" Chemical Society Reviews, Mar. 4, 2013, pp. 3689-3707, vol. 42, No. 9.
Srivastava, Rajendra et al., "Synthesis and applications of ordered and disordered mesoporous zeolites: Present and future prospective" Catalysis Today, Aug. 10, 2017, pp. 172-188, vol. 309.
Li, Bowen et al., "Synthesis and characterization of mesoporous zeolite Beta templated by a novel organosiloxane" Journal of Porous Materials, Mar. 22, 2017, pp. 1673-1678, vol. 24, No. 6.
International Search Report and Written Opinion dated Oct. 18, 2019 pertaining to International application No. PCT/US2019/045485 filed Aug. 7, 2019, 19 pgs.
Linares, M. et al. "Effect of hierarchical porosity in Beta zeolites on the Beckmann rearrangement of oximes", Jan. 1, 2017, pp. 181-190, vol. 7, No. 1, Catalysis Science & Technology.
Chu, G. et al. "Preparation of 4-butylaniline-bonded silica gel for the solid-phase extraction of flavone glycosides" Apr. 1, 2015, pp. 1149-1155, vol. 38, No. 7, Journal of Seapration Science.
Serrano, D.P. et al. "Molecular and Meso- and Macroscopic Properties of Hierarchical Nanocrystalline ZSM-5 Zeolite Prepared by Seed Silanization" Feb. 24, 2009, pp. 641-654, vol. 21, No. 4 Chemistry of Materials.
Serrano, D.P. et al. "Narrowing the mesopore size distribution in hierarchical TS-1 zeolite by surfactant-assisted reorganization" Sep. 25, 2013, pp. 71-82, vol. 189, Microporous and Mesoporous Materials.
Office Action dated Sep. 15, 2020 pertaining to U.S. Appl. No. 15/974,154, filed May 8, 2018, 24 pgs.

\* cited by examiner

ORGANOSILANE TEMPLATES AND METHODS FOR THE SYNTHESIS OF MESOPOROUS ZEOLITES

TECHNICAL FIELD

The present disclosure generally relates to mesoporous zeolites and methods of making mesoporous zeolites. Specifically, the present disclosure relates to mesoporous zeolites and methods of making mesoporous zeolites with tunable physical properties.

BACKGROUND

Zeolites are aluminosilicate minerals that are useful in a variety of applications, including oil refining, sorption and separation processes, as size selective heterogeneous catalysts, as shape selective heterogeneous catalysts, as encapsulators, as slow-release agents, and for ion-exchange. However, the physical properties of the zeolites, including mesopore size, pore volume, and surface area of most zeolites may limit the use of zeolites in many applications.

In petroleum processes, upgrading or "cracking" hydrocarbons is often used to refine crude oil and other high molecular weight hydrocarbons into much more valuable, smaller "light" hydrocarbons, such as gasoline and olefinic gases. One of the most common upgrading techniques is catalytic cracking, in which catalysts, most commonly conventional zeolite catalysts, are used to upgrade the hydrocarbons. However, the most efficient or desirable center of pore width distribution of the zeolite for catalytic cracking may be distinct for differing hydrocarbon feeds or desired products. Specifically, the mechanism of zeolite catalysis is believed to be influenced by pore shape and size. As such, zeolite catalysts are selected with consideration of mesopore size, pore volume, and surface area to best upgrade the hydrocarbons.

Previous attempts at providing zeolites with mesoporosity of differing centers of pore width distribution has been made by using a single organosilane template to functionalize a growing seed crystal. Mesopore size is dictated by template structures and as a result each organosilane template results in a single center of pore width distribution. However, the specific centers of pore width distribution are limited to those corresponding to each organosilane template with many centers of pore width distribution unobtainable for lack of a corresponding organosilane template currently available.

SUMMARY

Accordingly, a need exists for new organosilane mesopore templates and methods to produce mesoporous zeolite catalysts with tunable physical properties. As such, this disclosure expands the range of mesopore sizes that can be achieved by introducing specially synthesized organosilane mesopore templates in accordance with the present disclosure. Additionally, methods in accordance with the present disclosure do not comprise a discrete functionalization step during formation of the mesoporous zeolites providing a streamlined zeolite synthesis process.

In accordance with embodiments of the present disclosure, a method of forming mesoporous zeolites with tunable pore widths is provided. The method includes mixing a silicon-containing material, an aluminum-containing material, and at least a quaternary amine to produce a zeolite precursor solution. The method further includes pre-crystallizing the zeolite precursor solution at a pre-crystallization temperature of greater than 125° C. and autogenous pressure to form a pre-crystallized zeolite precursor solution represented by the formation of an amorphous phase in pseudo-steady-state where solid and solution phases approach equilibrium and silicate and aluminosilicate anion distributions are established. Further, the method includes combining an organosilane mesopore template with the pre-crystallized zeolite precursor solution to produce a zeolite precursor gel and crystallizing the zeolite precursor gel to produce a crystalline zeolite intermediate. Finally, the method includes calcining the crystalline zeolite intermediate to produce the mesoporous zeolite. Further, the method does not include a discrete functionalization step of the zeolite precursor gel before crystallizing the zeolite precursor gel.

In accordance with embodiments of the present disclosure, an organosilane mesopore template is provided. The organosilane mesopore template includes a structure in accordance with wherein R is an aliphatic, aromatic, or heteroatom-containing group.

In accordance with embodiments of the present disclosure, a method of forming an organosilane mesopore template comprising a structure in accordance with wherein R is an aliphatic, aromatic, or heteroatom-containing group is provided. The method includes combining one equivalent of an aniline derivative with 1 to 1.5 equivalents of 3-glycidoxypropyltrimethoxysilane in the presence of ethanol to form a reaction mixture and stirring and heating the reaction mixture. Further, the aniline derivative includes a structure in accordance with Additional features and advantages of the technology disclosed in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings.

Reference will now be made in greater detail to various embodiments.

DETAILED DESCRIPTION

This disclosure is directed to various embodiments of methods of forming mesoporous zeolites with tunable physical properties. A "zeolite material" or "zeolites" refers to inorganic materials with regular intra-crystalline cavities and channels of molecular dimension. The porous structure of zeolites may render large surface areas and desirable size and shape selectivity, which may be advantageous for catalysis. The mesoporous zeolites described may include aluminosilicates, titanosilicates, or pure silicates. As used throughout this disclosure, "mesopores" or "mesoporous" refers to pores in a structure that have a diameter of greater than 2 nanometers (nm) and less than or equal to 50 nm. Similarly, to the extent used throughout the disclosure, "micropore" or "microporous" refers to pores in a structure that have a diameter of less than or equal to 2 nm and greater than or equal to 0.1 nm.

Embodiments of the present disclosure relate to methods for producing mesoporous zeolites with tunable physical properties. The methods include mixing a material containing silicon, a material containing aluminum, and a quaternary amine to create a zeolite precursor solution. The zeolite precursor solution is then pre-crystallized at pre-crystallization temperature of greater than 125° C. and autogenous pressure to form to generate a pre-crystallized zeolite precursor solution. Subsequently, the pre-crystallized zeolite precursor solution is combined with an organosilane mesopore template to form a zeolite precursor gel. The precursor gel may then be crystallized to produce a crystalline zeolite intermediate. The crystalline zeolite intermediate may be centrifuged, washed, and dried, and finally, the two or more distinct organosilane mesopore templates may be removed by a calcination step to produce the mesoporous zeolite. Without being bound by theory, it is believed that the removal of the organosilane mesopore template forms at least a portion of the mesopores of the mesoporous zeolite, where the mesopores are present in the space or voids once inhabited by the organosilane mesopore template.

Without being bound by any particular theory, mesoporous zeolites can be synthesized using templates such as organosilane mesopore templates. Mesoporosity may be introduced to zeolites through destructive or constructive methods. Destructive methods include dealumination and desilication, which leach atoms from commercially available materials. However, destructive methods lack control of pore generation size and frequency, may cause amorphization, have limited flexibility in the Si/Al ratio. Constructive methods involve synthesizing zeolites by crystallizing the mineral around a template structure that is burned off during a calcination step, leaving behind pores and channels and are the focus of this disclosure.

The present disclosure relates to use of the organosilane mesopore templates to synthesize mesoporous zeolites with tunable physical properties. Specifically, surface area, pore size, and pore volume of the formed mesoporous zeolites may be adjusted or tuned based on size and structure of the organosilane mesopore template utilized in forming the mesoporous zeolite. The methods of this disclosure and the custom designed organosilane templates disclosed provide capability of forming mesoporous zeolites with pore sizes distinct from those formed using commercially available organosilane templates.

The organosilane mesopore templates may comprise a general structure in accordance with Chemical Structure 1, where R is an aliphatic, aromatic, or heteroatom-containing group.

Chemical Structure 1

In one or more embodiments, the organosilane mesopore templates are synthesized by combining an aniline derivative comprising the selected R group of Chemical Structure 1 with 3-glycidoxypropyltrimethoxysilane in the presence of ethanol to form a reaction mixture. Specifically, the organosilane mesopore templates may be synthesized by combining one equivalent of the aniline derivative with 1 to 1.5 equivalents of 3-glycidoxypropyltrimethoxysilane in the presence of ethanol. The synthesis reaction is completed in accordance with Reaction 1 provided subsequently. In one or more embodiments, the synthesis may be completed in a Schlenk flask while the reaction mixture is stirred at reflux for 4 to 24 hours, 6 to 20 hours, 12 to 18 hours, or approximately 16 hours. In some embodiments, the temperature may be held at approximately 110° C. which is above reflux as the system is sealed. In one or more further embodiments, the synthesis may be completed in a sealed vessel, such as a sealed microwave vial, while the reaction mixture is stirred at a temperature of 120 to 180° C., 130 to 170° C., or approximately 150° C. for 10 to 90 minutes, 15 to 60 minutes, or 20 to 45 minutes. The resulting organosilane mesopore template synthesized in accordance with either method may then be purified using column chromatography on silica gel. Without wishing to be bound by theory, it is believed that heating at too great a temperature or for too great a time may result in decomposition of the sample.

Reaction 1

As indicated previously, the R group in Chemical Structure 1 may be an aliphatic, aromatic, or heteroatom-containing group. In one or more embodiments, the R group in Chemical Structure 1 may be an aliphatic group. Example aliphatic groups include a single hydrogen atom (H), a methyl group, an ethyl group, a propyl group, and cyclic alkanes. In one or more embodiments, the R group in Chemical Structure 1 may be an aromatic group. Example aromatic groups include a phenyl group (Ph) ($C_6H_5$), styryl group, substituted phenyl, and substituted styryl groups. In one or more embodiments, the R group in Chemical Structure 1 may be a heteroatom-containing group. Example heteroatom-containing groups include a cyclic compound comprised of one or more silicon, nitrogen, or oxygen atom.

Without being bound by any theory, use of the organosilane mesopore templates in accordance with Chemical Structure 1 may help mitigate the potential issues usually associated with template-driven zeolite synthesis. Utilization of templates may offer improved control over the size and shape of the mesopores formed during the zeolite synthesis when compared to destructive methods of mesopore formation; however, conventionally, there have been several drawbacks to the existing templating procedures. One of the problems is the mesopore size may only be changed by changing the structure of the organosilane mesopore template and as such is limited by the availability of distinct and unique organosilane mesopore templates. As pore widths are limited to those with a corresponding organosilane template associated with the specific static center of pore width distribution desired, it may not be possible to generate mesoporous zeolite with the desired center of pore width distribution from previously available organosilane mesopore templates. Generation of new custom designed and synthesized organosilane mesopore templates in accordance with Chemical Structure 1 provides additional pore width options over previously available organosilane mesopore templates.

In some embodiments, a silicon-containing material, an aluminum-containing material, or both, may be combined with a quaternary amine to form a zeolite precursor solution. The quaternary amine may be utilized as a structure directing agent (SDA) for the fabrication of the zeolite microstructure. Quaternary ammonium is generally depicted in Chemical Structure 2. The quaternary ammonium cations serve as crystallization centers for the forming zeolite subunits, thus creating the regular system of micropores in the zeolite structure.

Chemical Structure 2

As used throughout this disclosure, the encircled plus symbols ("+") show cationic positively charged centers. R groups (including R1, R2, R3, R4) represent chemical constituents. One or more of the various R groups may be structurally identical or may be structurally different from one another.

In Chemical Structure 2, R1, R2, R3, and R4 may include hydrogen atoms or hydrocarbons, such as a hydrocarbon chain. As used throughout this disclosure, a "hydrocarbon" refers to a chemical or chemical moiety containing only hydrogen and carbon atoms. In some other embodiments, R1, R2, R3, and R4 may contain one or more heteroatoms, such as oxygen, sulfur, nitrogen, or phosphorus. For example, the hydrocarbon chain may be branched or unbranched, and may comprise an alkane hydrocarbon chain, an alkene hydrocarbon chain, or an alkyne hydrocarbon chain, including cyclic or aromatic moieties. In some embodiments, one or more of R1, R2, R3, or R4 may represent hydrogen atoms. As used throughout this disclosure, a heteroatom is a non-carbon and non-hydrogen atom. In embodiments, the quaternary ammonium may be present in a cyclic moiety, such as a five atom ring, a six atom ring, or a ring comprising a different number of atoms. For example, in Chemical Structure 2, the R1 and R2 constituents may be part of the same cyclic moiety.

In one or more embodiments, the two cationic moieties may form ionic bonds with anions. Various anionic chemical species are contemplated, including $Cl^-$, $Br^-$, $F^-$, $I^-$, $OH^-$, ½ $SO_4^{2-}$, ⅓ $PO_4^{3-}$, ½ $S^{2-}$, $AlO_2^-$. In some embodiments, an anion with a negative charge of more than 1-, such as 2-, 3-, or 4-, may be utilized, and in those embodiments, a single anion may pair with multiple cations of the structure-directing agent. As used throughout this disclosure, a fraction listed before an anionic composition means that the anion is paired with more than one cation and may, for example, be paired with the number of cations equal to its negative charge.

In one or more embodiments, two cations of a monomer may be separated from one another by a hydrocarbon chain. The hydrocarbon chain may be branched or unbranched, and may comprise an alkane hydrocarbon chain, an alkene hydrocarbon chain, or an alkyne hydrocarbon chain, including cyclic or aromatic moieties. In one embodiment, the length of the hydrocarbon chain (measured as the number of carbons in the chain directly connecting the two cations) may be from 1 to 10,000 carbon atoms, such 1 to 20 carbon atom alkane chains.

In some embodiments, the quaternary amine may comprise a tetraalkyl ammonium hydroxide, such as tetraethylammonium hydroxide (TEAOH). In other embodiments, the quaternary amine may comprise propyltrimethylammonium hydroxide, tetramethylammonium hydroxide, tetrapropylammonium hydroxide, octyltrimethylammonium hydroxide, dodecyltrimethylammonium hydroxide, cetyltrimethylammonium hydroxide, or combinations of these.

In one or more embodiments, the silicon-containing materials comprise silica ($SiO_2$), sodium silicate, tetramethylsiloxane, tetraethylsiloxane, silicate salt, silicon alkoxide, or combinations thereof.

In one or more embodiments, the aluminum-containing materials comprise alumina ($Al_2O_3$), aluminum nitrate, aluminum sulfate, aluminum alkoxide, other aluminum salts, or combinations thereof.

As previously indicated, the zeolite precursor solution is pre-crystallized to generate a pre-crystallized zeolite precursor solution. Pre-crystallization represents the formation of an amorphous phase in pseudo-steady-state where solid and solution phases approach equilibrium and silicate and aluminosilicate anion distributions are established. In one or more embodiments, the zeolite precursor solution is pre-crystallized in a polytetrafluoroethylene (PTFE) (commonly known as Teflon™) lined stainless steel autoclave at 135° C. and autogenous pressure for 48 hours. In various embodiments, the pre-crystallization is completed at a pre-crystallization temperature of greater than 105° C., greater than 115° C., greater than, or greater than 125° C. including in the range of 115° C. to 145° C., 125° C. to 135° C., and 135° C. to 145° C. Further, in various embodiments, the zeolite precursor solution is kept in the PTFE lined stainless steel autoclave at the pre-crystallization temperature and autogenous pressure for 24 hours, 30 hours, 36 hours, 42 hours, 54 hours, 60 hours, or 72 hours including 24 hours to 72 hours, 30 hours to 48 hours, 36 hours to 54 hours, and 42 hours to 72 hours.

In embodiments, the pre-crystallized zeolite precursor solution may be combined with an organosilane mesopore template to form the zeolite precursor gel. In one or more embodiments, a quaternary amine may additionally be added to the pre-crystallized zeolite precursor solution to generate the zeolite precursor gel. The quaternary amine may be the same as the quaternary amine utilized in the initial combination of the silicon-containing material, the aluminum-containing material, or both, with the quaternary amine to form the zeolite precursor solution. In one or more specific embodiments, the quaternary amine is TEAOH.

The loading of the organosilane mesopore templates determines the total pore volume of the final mesoporous zeolite. An increase in organosilane mesopore template loading corresponds to an increase in the total pore volume of the mesoporous zeolite. In various embodiments, the total loading of the organosilane mesopore template as a mole percent (mol %) with respect to the silicon-containing material loading may be 0.5 mol %/o, 1 mol %, 2.5 mol %, 5 mol %, 10 mol %, 15 mol %, 20 mol % or 25 mol % including all the ranges subsumed therein.

The precursor gel may then be crystallized to produce the crystalline zeolite intermediate. In one or more embodiments, the precursor gel is crystallized in a PTFE lined stainless steel autoclave at 170° C. and autogenous pressure for 7 days. In various embodiments, the crystallization is completed at a crystallization temperature greater than 140° C., greater than 150° C., greater than, or greater than 160° C. including in the range of 140° C. to 170° C., 150° C. to 160° C., and 150° C. to 170° C. Further, in various embodiments, the zeolite precursor solution is kept in the PTFE lined stainless steel autoclave at the crystallization temperature and autogenous pressure for 3 days, 5 days, 10 days, or 12 days including 3 days to 12 days, 5 days to 7 days, 7 days to 12 days, and 3 days to 10 days.

In some embodiments, the crystalline zeolite intermediate may be calcined. Calcining may occur in the presence of air at temperatures above 500° C., above 550° C., above 600° C., or even above 750° C. The calcining step may remove the two or more distinct organosilane mesopore templates and structure-directing agents, for instance, by burning them off. The elevated temperature to calcine the crystalline zeolite intermediate may be maintained for 3 hours, 5 hours, 6 hours, or 8 hours including 3 hours to 8 hours, 5 hours to 8 hours, and 6 hours to 8 hours. Upon calcination, the organosilane mesopore templates may be removed to give rise to the mesopore-sized voids in the produced mesoporous zeolite. Various heater units are envisioned as suitable, including ovens and autoclaves, or use of any other known techniques in the industry.

In embodiments, the mesoporous zeolites fabricated in accordance with this disclosure can be characterized as exhibiting a Y or faujasite framework, an MFI (mordenite framework inverted) framework, or a BEA (Beta polymorphs A and B) framework. For example, the mesoporous zeolites described may be characterized as ZSM-5 (that is, having an aluminosilicate MFI framework type), as TS-1 (that is, having a titanosilicate MFI framework type), or as silicalite-I (that is, having a pure silicate MFI framework type) zeolite. In other embodiments, the mesoporous zeolites described may be characterized as Beta (that is, having an aluminosilicate BEA framework type) or faujasite (having a Y-type framework). In some particular embodiments, the mesoporous zeolites fabricated by the methods of the present disclosure may be Beta framework zeolites.

Without being bound by any particular theory, the materials of the at least one silicon-containing material, aluminum-containing material, or both, may determine the material composition of the mesoporous zeolite produced, which may be an aluminosilicate, a titanosilicate, or a pure silicate zeolite. In some embodiments, the mesoporous zeolite of the present disclosure may be an aluminosilicate mesoporous zeolite with a molar ratio of Si/Al of greater than or equal to 5, greater than or equal to 10, greater than or equal to 30, or greater than or equal to 50. In some embodiments, the mesoporous zeolite of the present disclosure may be an aluminosilicate mesoporous zeolite with a molar ratio of Si/Al of greater than or equal to 5 and less than 100, greater than or equal to 10 and less than 100, greater than or equal to 25 and less than 100, greater than or equal to 30 and less than 100, greater than or equal to 20 and less than 80, greater than or equal to 40 and less than 80, greater than or equal to 25 and less than 75, or even greater than or equal to 35 and less than 95. In other embodiments, the mesoporous zeolite of the present disclosure may be a pure silicate zeolite, and may have a negligible amount or no amount of aluminum is present, with a Si/Al molar ratio that theoretically approaches infinity. As used herein a "pure silicate" refers to a material comprising at least about 99.9 weight percent (wt. %) of silicon and oxygen atoms. A pure silica mesoporous zeolite may be formed by utilizing only silicon-containing materials and no aluminum.

The mesoporous zeolites of the present disclosure may comprise mesopores and micropores. The mesoporous zeolites may have surface areas and pore volumes greater than that of conventionally produced zeolites. In this disclosure, a "conventional zeolite" or "conventionally produced zeolite" refers to a zeolite that does not substantially comprise mesopores (for example, less than 0.5% of the zeolite pore volume is characterized as mesopores). Without being bound by any particular theory, it is believed that the quaternary amines utilized by the present disclosure may aid in forming the micropores, whereas the mesopores may be formed from the voids created during calcination of the organosilane mesopore templates.

The mesoporous zeolites described in the present disclosure may have enhanced catalytic activity. The tuning of the center of pore width distribution of the mesopores by utilizing the organosilane mesopore templates in accordance with Chemical Structure 1 allows for selection of mesopore sizing which is optimized for specific catalytic reactions. Specifically, the tuned mesopore sizing may allow for greater catalytic functionality because more catalytically active sites are available for contact with the reactant in a catalytic reaction. Similarly, the mesopores may allow for better access to microporous catalytic sites on the mesoporous zeolite.

The mesoporous zeolites described may form as particles that may be generally spherical in shape or irregular globular shaped (that is, non-spherical). In embodiments, the particles have a "particle size" measured as the greatest distance between two points located on a single zeolite particle. For example, the particle size of a spherical particle would be its diameter. In other shapes, the particle size is measured as the distance between the two most distant points of the same particle, where these points may lie on outer surfaces of the particle. The particles may have a particle size from 25 nm to 500 nm, from 50 nm to 400 nm, from 100 nm to 300 nm, or less than 900 nm, less than 800 nm, less than 700 nm, less than 600 nm, less than 500 nm, less than 400 nm, less than 300 nm, or less than 250 nm. Particle sizes may be determined by examination under a TEM or SEM microscope.

Using physisorption, surface area, pore size, and pore volume may be calculated. Physisorption measures gas uptake to calculate the surface area, pore size, and pore volume. Output from the physisorption isotherm is in the form of a graph representing cumulative pore volume with respect to pore size. The first derivative of such graph provides differential pore volume (dV(d)) and the distribution of pore sizes.

Using temperature-programmed desorption (TPD), also known as Thermal desorption spectroscopy (TDS), the binding energy of the mesoporous zeolite may be calculated. TPD operated under the principle that when molecules or atoms come in contact with a surface, they adsorb onto it, minimizing their energy by forming a bond with the surface. The binding energy varies with the combination of the adsorbate and surface. If the surface is heated the energy transferred to the adsorbed species will cause it to desorb. The temperature at which this happens is known as the desorption temperature and provides information on the binding energy.

EXAMPLES

Using the methods of the present disclosure, mesoporous zeolites were produced to exemplify the attributes previously described. Four example methods were undertaken in accordance with the present disclosure in which the method did not comprise a discrete functionalization step of the zeolite precursor gel before crystallizing the zeolite precursor gel. Another four example methods were conducted where the method included a discrete functionalization step of the zeolite precursor gel before crystallizing the zeolite precursor gel. Additional example methods were completed with the total loading of organosilane mesopore template varied as well as with no organosilane mesopore template present.

Example Preparation Protocol 1 (No Functionalization Step)

Each example zeolite was a zeolite beta prepared with the following molar composition: 1 $Al_2O_3$: 60 $SiO_2$: 31 TEAOH: 1000 $H_2O$. The initial formulation was prepared by combining fumed silica (2.955 g), aluminum powder (0.044 g), tetraethylammonium hydroxide (TEAOH) (10.693 g-35% aqueous solution), and distilled water (7.742 g). The initial formulation mixture was pre-crystallized in a polytetrafluoroethylene (PTFE) (commonly known as Teflon™) lined stainless steel autoclave at 135° C. and autogenous pressure for 48 hours. The resulting gel was mixed with additional aqueous TEAOH (27.86 g-13% aqueous solution) and each organosilane mesopore template at the provided loading for each example. The gel with additional aqueous TEAOH was then crystallized in a PTFE-lined stainless steel autoclave at 170° C. and autogenous pressure for 7 days. The mole % (mol %) for each loading is based on the silicon content of the gel. The resulting zeolite products were then separated by centrifugation, washed multiple times with water, dried, and then calcined at 550° C. for 6 hours.

An initial set of Inventive Examples were prepared using Template 1, Template 2, Template 3, and Template 4 in accordance with the Example Preparation Protocol 1 pro- vided previously. Template 1 is an organosilane template having the chemical structure illustrated infra.

TEMPLATE 1

Template 2 is an organosilane template having the chemical structure illustrated infra.

TEMPLATE 2

Template 3 is an organosilane template having the chemical structure illustrated infra.

TEMPLATE 3

Template 4 is a commercially available organosilane template having the chemical structure illustrated infra, phenylaminopropyltrimethoxysilane (PHAPTMS).

TEMPLATE 4

Inventive Example 1-5 mol % Template 1

Inventive Example 1 was prepared in accordance with the example preparation protocol 1 provided supra with the organosilane mesopore template addition comprising loading with 5 mol % of Template 1.

Inventive Example 2-5 mol % Template 2

Inventive Example 2 was prepared in accordance with the example preparation protocol 1 provided supra with the organosilane mesopore template addition comprising loading with 5 mol % of Template 2.

Inventive Example 3-5 mol % Template 3

Inventive Example 3 was prepared in accordance with the example preparation protocol 1 provided supra with the organosilane mesopore template addition comprising loading with 5 mol % of Template 3.

Inventive Example 4-5 mol % Template 4

Inventive Example 4 was prepared in accordance with the example preparation protocol 1 provided supra with the organosilane mesopore template addition comprising loading with 5 mol ° % of Template 4.

Example Preparation Protocol 2 (with a Functionalization Step)

Each example zeolite was a zeolite beta prepared with the following molar composition: 1 $Al_2O_3$:60 $SiO_2$:31 TEAOH: 1000 $H_2O$. The initial formulation was prepared by combining fumed silica (2.955 g), aluminum powder (0.044 g), tetraethylammonium hydroxide (TEAOH) (10.693 g-35% aqueous solution), and distilled water (7.742 g). The initial formulation mixture was pre-crystallized in a polytetrafluoroethylene (PTFE) (commonly known as Teflon™) lined stainless steel autoclave at 135° C. and autogenous pressure for 48 hours. The resulting gel was mixed with additional aqueous TEAOH (27.86 g-13% aqueous solution) and each organosilane mesopore template at the provided loading for each example. The gel with additional aqueous TEAOH was then stirred at ambient pressure and 90° C. for 6 hours and then subsequently crystallized in a PTFE-lined stainless steel autoclave at 170° C. and autogenous pressure for 7 days. The mole % (mol %) for each loading is based on the silicon content of the gel. The resulting zeolite products were then separated by centrifugation, washed multiple times with water, dried, and then calcined at 550° C. for 6 hours.

An initial set of Comparative Examples were prepared using Template 1, Template 2, Template 3, and Template 4 in accordance with the Example Preparation Protocol 2 provided previously.

Comparative Example 5-5 mol % Template 1

Comparative Example 5 was prepared in accordance with the example preparation protocol 2 provided supra with the organosilane mesopore template addition comprising loading with 5 mol % of Template 1.

Comparative Example 6-5 mol % Template 2

Comparative Example 6 was prepared in accordance with the example preparation protocol 2 provided supra with the organosilane mesopore template addition comprising loading with 5 mol % of Template 2.

Comparative Example 7-5 mol % Template 3

Comparative Example 7 was prepared in accordance with the example preparation protocol 2 provided supra with the organosilane mesopore template addition comprising loading with 5 mol ° % of Template 3.

Comparative Example 8-5 mol % Template 4

Comparative Example 8 was prepared in accordance with the example preparation protocol 2 provided supra with the organosilane mesopore template addition comprising loading with 5 mol % of Template 4.

An additional set of Inventive Examples were prepared by varying the loading of the organosilane mesopore template in the preparation protocol. Inventive Examples were prepared using Template 2 and a loading of 2.5 mol % and 10 mol % as well as Template 3 and a loading of 2.5 mol % and 10 mol %. In combination with Inventive Examples 2 and 3, loadings of 2.5 mol %, 5 mol %, and 10 mol % are provided for each of Template 2 and Template 3.

Inventive Example 9-10 mol % Template 2

Inventive Example 9 was prepared in accordance with the example preparation protocol 1 provided supra with the organosilane mesopore template addition comprising loading with 10 mol % of Template 2.

Inventive Example 10-2.5 mol % Template 2

Inventive Example 10 was prepared in accordance with the example preparation protocol 1 provided supra with the organosilane mesopore template addition comprising loading with 2.5 mol % of Template 2.

Inventive Example 11-10 mol % Template 3

Inventive Example 11 was prepared in accordance with the example preparation protocol 1 provided supra with the organosilane mesopore template addition comprising loading with 10 mol % of Template 3.

Inventive Example 12-2.5 mol % Template 3

Inventive Example 12 was prepared in accordance with the example preparation protocol 1 provided supra with the organosilane mesopore template addition comprising loading with 2.5 mol % of Template 3.

Comparative Example 13—No Template

A final comparative Example, Comparative Example 13, was prepared in accordance with the example preparation protocol 1 provided supra, but with no addition of an organosilane mesopore template.

Figure 1A:
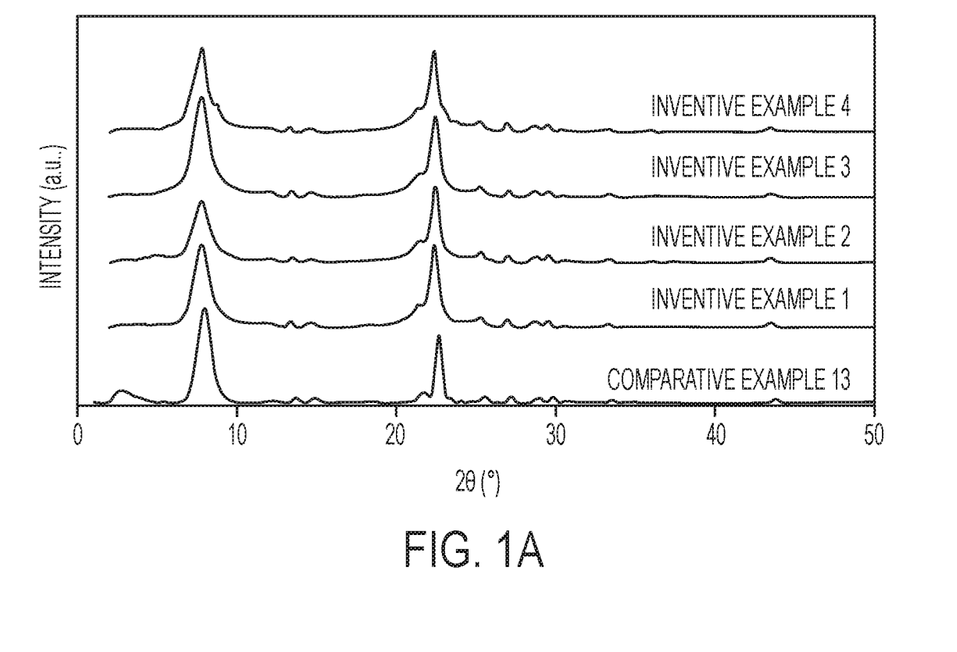
FIG. 1A is an X-ray diffraction spectra for inventive mesoporous zeolites and mesoporous zeolites formed according to one or more embodiments shown and described herein.
Figure 1B:
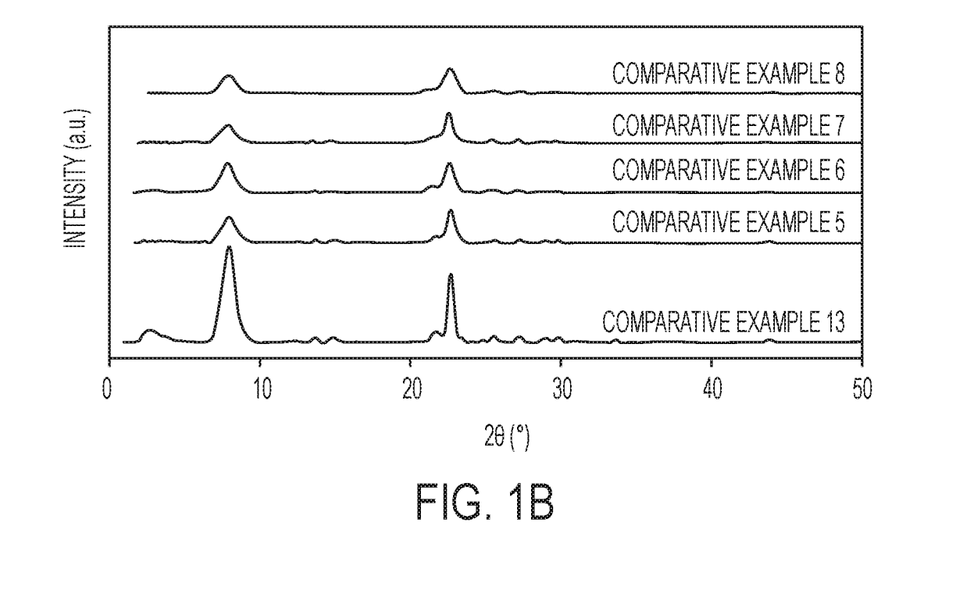
FIG. 1B is an X-ray diffraction spectra for comparative mesoporous zeolites and mesoporous zeolites formed according to one or more embodiments shown and described herein.

With reference to FIGS. 1A and 1B, the characteristic zeolite beta peaks may be observed in the X-ray diffraction spectra. In FIG. 1A, the X-ray diffraction spectra for each of inventive Examples 1, 2, 3, and 4 and comparative Example 13 demonstrate peaks at 2θ of approximately 7° and approximately 22° as well as multiple less intense peaks at various other angles as is characteristic of zeolite beta. This demonstrates that the procedure of example preparation protocol 1 results in zeolite beta. Similarly, in FIG. 1B, the X-ray diffraction spectra for each of comparative Examples 5, 6, 7, 8, and 13 demonstrate the same peaks at 2θ of approximately 7° and approximately 22° characteristic of zeolite beta. This demonstrates that the procedure of example preparation protocol 1 results in zeolite beta regardless of the inclusion of a functionalization step.

Figure 2:
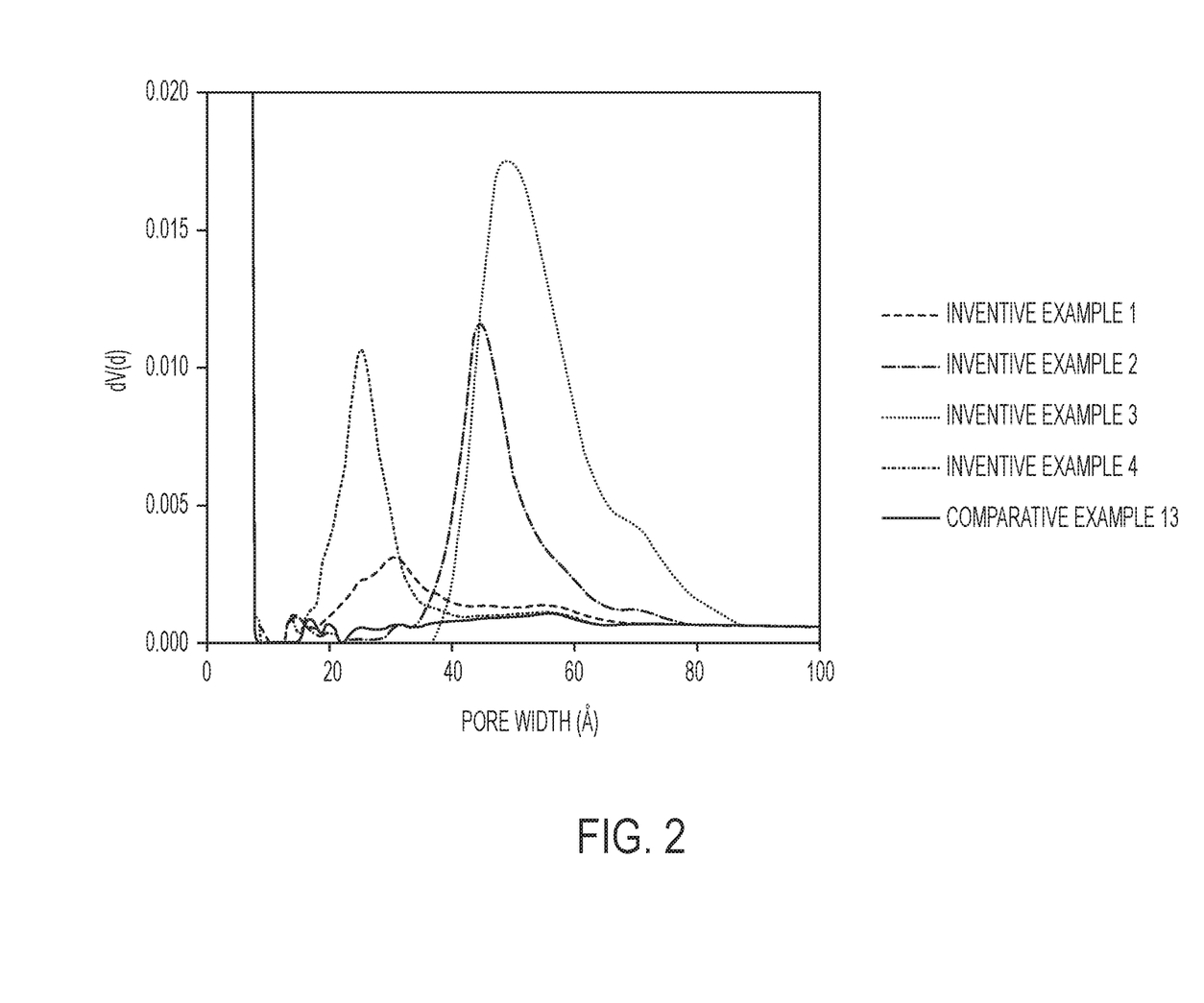
FIG. 2 is a graph of center of pore width distribution of comparative mesoporous zeolites and mesoporous zeolites formed according to one or more embodiments shown and described herein.

With reference to FIG. 2, the distribution of pore widths for Inventive Examples 1-4 and Comparative Example 13 demonstrates the shift in center of pore width distribution as the organosilane mesopore template type is varied. Specifically, changing the template type allows for tuning of the resulting pore size distributions for the final zeolite crystal. The resulting pore size distribution that results is dependent on the size and shape of the organosilane mesopore template. Inventive Example 1 (Template 1) is indicated as having a center of pore width distribution of approximately 32 angstrom (Å). Inventive Example 2 (Template 2) is indicated as having a center of pore width distribution of approximately 44 Å. Inventive Example 3 (Template 3) is indicated as having a center of pore width distribution of approximately 50 Å. Inventive Example 4 (Template 4) is indicated as having a center of pore width distribution of approximately 25 Å. As expected, Comparative Example 13 (No template) does not have a clear peak representing a center of pore width distribution. It may be appreciated from a review of FIG. 2 that the center of pore width distribution may be tuned by changing the organosilane mesopore templates used for the zeolite synthesis and more specifically the size and shape of the organosilane mesopore templates. Without wishing to be bound by theory, it is noted that the R group in each of Templates 1, 2, and 3 is progressively larger for each of Templates 1, 2, and 3 respectively and a commensurate increase in pore width is observed.

For purposes of this disclosure, the term "center of pore width distribution" refers to the pore width value of the pores of the mesoporous zeolite which is most prevalent. With reference to FIG. 2, it may be observed that the frequency of occurrence of individual pore widths in a mesoporous zeolite follow an imperfect Gaussian function. The center of pore width distribution corresponds to the specific pore width having the maximum frequency of occurrence represented by the peak of the plotted individual pore widths.

Figure 3:
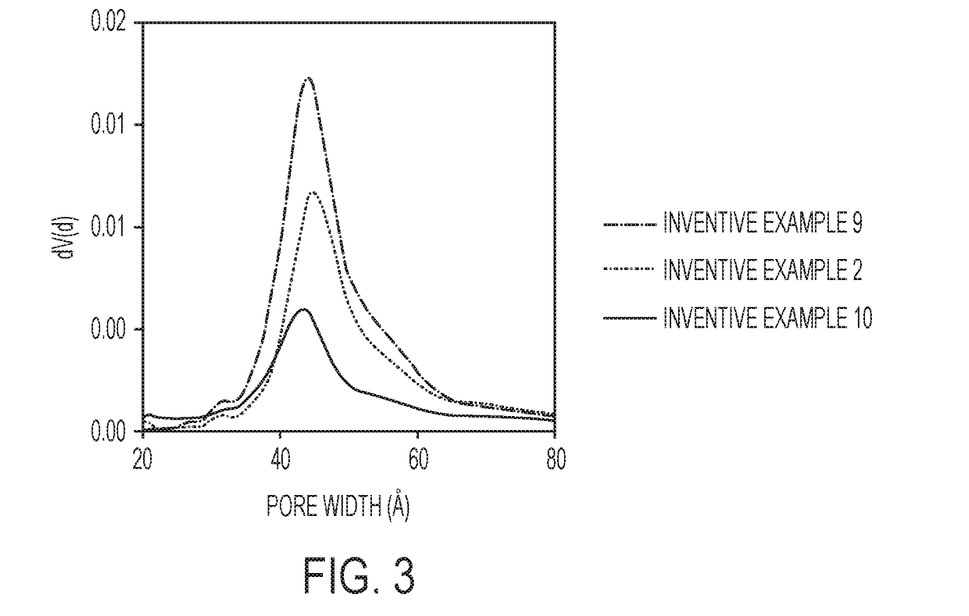
FIG. 3 is a graph of center of pore width distribution of mesoporous zeolites formed with varying organosilane template loading according to one or more embodiments shown and described herein.

The total pore volume within the formed mesoporous zeolites may also be adjusted by varying the loading of the organosilane mesopore templates during zeolite formation. With reference to FIG. 3, the distribution of pore widths for Inventive Example 2 (5 mol % Template 2), Inventive Example 9 (10 mol % Template 2), and Inventive Example 10 (2.5 mol % Template 2) demonstrates the shift in total pore volume as the loading of the organosilane mesopore template is varied. Specifically, increasing the loading of the organosilane mesopore template from 2.5 mol % to 5 mol % and then to 10 mol % results in a commensurate increase in the pore volume while the center of pore width distribution remains consistent at approximately 44 Å.

Figure 4:
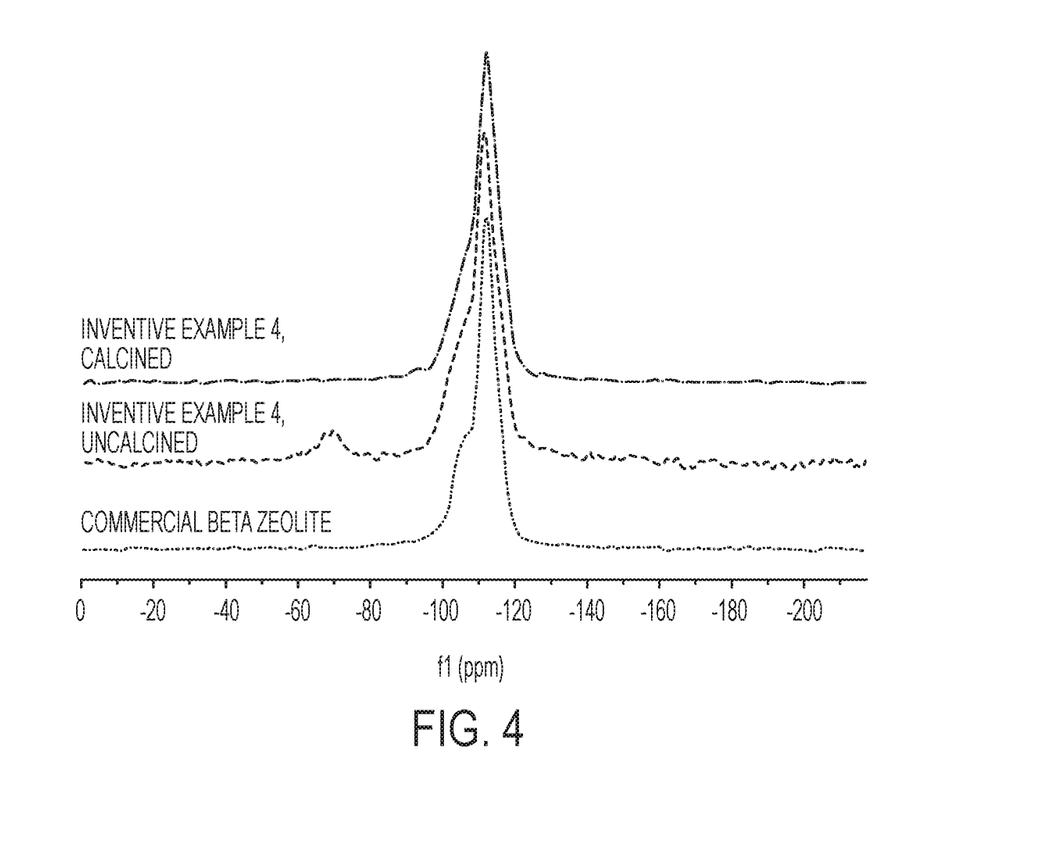
FIG. 4 is a magic angle spinning nuclear magnetic resonance (MAS-NMR) spectroscopy spectra for a comparative mesoporous zeolite, an uncalcined mesoporous zeolite and a mesoporous zeolite formed according to one or more embodiments shown and described herein.

During formation of the mesoporous zeolite, the organosilane mesopore templates covalently attach to the zeolite seed crystals formed in the pre-crystallization step. Using solid state $^{29}$Si magic angle spinning nuclear magnetic resonance (MAS-NMR) spectroscopy, confirmation of organosilane mesopore template attachment to the uncalcined zeolite crystal may be achieved. The uncalcined zeolite crystal represents the mesoporous zeolite prior to the calcination step at 550° C. for 6 hours such that the organosilane mesopore template is still present in the sample. Magic angle spinning is a technique used in nuclear magnetic resonance testing in which spinning the sample at the magic angle $\theta_m$ (ca 54.74°, where $\cos^2\theta_m=\frac{1}{3}$) with respect to the direction of the magnetic field results in the normally broad lines become narrower, increasing the resolution for better identification and analysis of the spectrum. The present MAS-NMR was completed by spinning the sample at a frequency of 100 MHz with a 500 MHz NMR. With reference to FIG. 4, a MAS-NMR spectra of Inventive Example 4 (Inventive Example 4—calcined), Inventive Example 4 without the calcination step (Inventive Example 4—uncalcined), and a commercial beta zeolite. The commercial beta zeolite comprised 931 HOA from Tosoh Corporation, Tokyo Japan. A signal at approximately −70 ppm in Inventive Example 4—uncalcined is indicative of a silicon atom linked to a carbon atom from the organosilane mesopore template in addition to three other silicon atoms through an oxygen bridge. This peak disappears in the spectrum for the calcined sample (Inventive Example 4), confirming the removal of the template upon calcination. It is also noted that the peak is not present in the commercially available zeolite beta sample. NMR parameters used for testing were based on Chem. Mater. 2009 21, 641-654, such parameters incorporated by reference herein.

Figure 5:
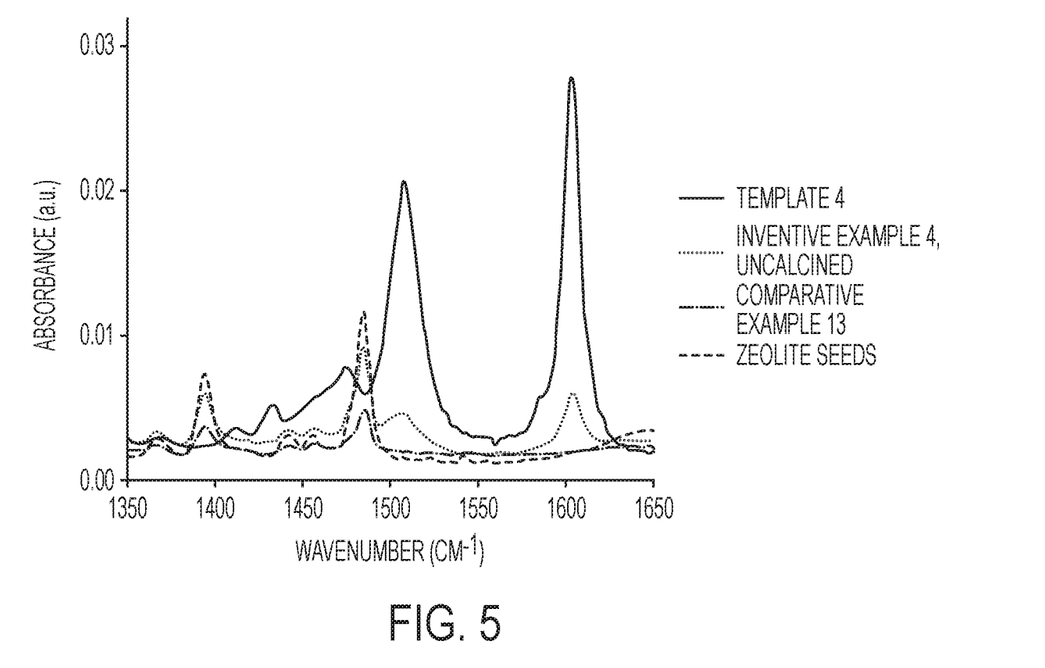
FIG. 5 is a Fourier transform infrared spectroscopy (FTIR) spectra for an organosilane mesopore template, a comparative mesoporous zeolite, zeolite seeds, and uncalcined mesoporous zeolite formed according to one or more embodiments shown and described herein.
Figure 6:
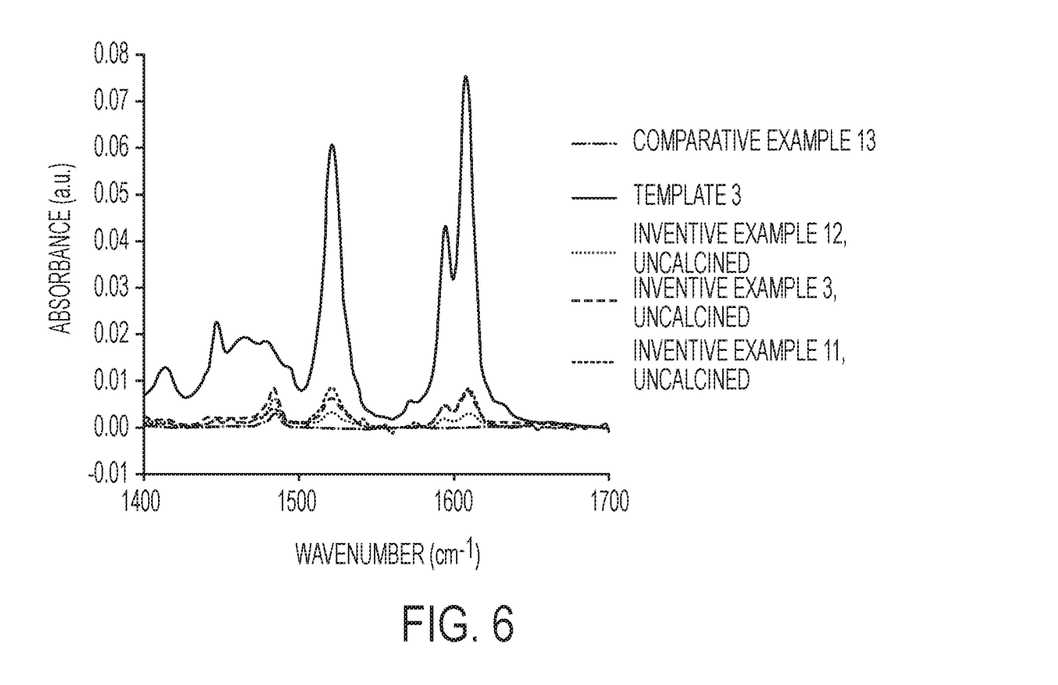
FIG. 6 is a Fourier transform infrared spectroscopy (FTIR) spectra for an organosilane mesopore template, a comparative mesoporous zeolite, and uncalcined mesoporous zeolites formed according to one or more embodiments shown and described herein.

Template attachment to the zeolite seed crystals was also verified with Fourier transform infrared spectroscopy (FTIR) FTIR signals around 1500 $cm^{-1}$ and 1600 $cm^{-1}$ correspond to N—H stretching and C=C aromatic stretching in the template, respectively. With reference to FIG. 5, a FTIR spectra of unincorporated Template 4 (PHAPTMS) and uncalcined Inventive Example 4 along with a control zeolite and the initially formed zeolite seeds, these same signals may be seen. Specifically, large peaks are visible for the Template 4 sample around 1500 $cm^{-1}$ and 1600 $cm^{-1}$ with smaller peaks visible for the uncalcined Inventive Example 4 sample and no peaks for the control zeolite. The control zeolite was prepared in accordance with Comparative Example 13. Similarly, with reference to FIG. 6, a FTIR spectra of unincorporated Template 3 and Inventive Examples 3 and 11-12 along with a control zeolite, the same signals may be seen Specifically, large peaks are visible for the unincorporated Template 3 sample around 1500 $cm^{-1}$ and 1600 $cm^{-1}$ with smaller peaks visible for the uncalcined Inventive Examples 3 and 11-12 sample. Further, no corresponding peaks are visible for the control zeolite. The control zeolite was once again Comparative Example 13.

Verification of template attachment and mesopore formation in the absence of a functionalization step was verified. With reference to FIG. 5, it is noted in FIG. 5 that the unincorporated Template 4 and uncalcined Inventive Example 4 both demonstrate the peaks around 1500 $cm^{-1}$ and 1600 $cm^{-1}$, but the control zeolite and the zeolite seeds do not. The FTIR spectra of FIG. 5 graphically demonstrate that there may be template attachment and mesopore formation in the absence of a functionalization step as there was no functionalization for the zeolite seed samples, but the as-formed Inventive Example 4 demonstrates functionalization even in the absence of a discrete functionalization step.

The properties of Inventive Examples 1-4, Comparative Examples 5-8, and Comparative Example 13 are listed in Table 1. As evidenced by the physisorption and temperature-programmed desorption data tabulated in table 1, omitting a discrete functionalization step does not adversely affect the physical properties of the resulting mesoporous zeolite.

For the physisorption analysis, argon physisorption measurements were performed at 87K (−186.7° C.). Samples were degassed overnight at 350° C. before measurement. Adsorption isotherms were collected as a function of relative pressure (p/p°) for p/p° of 0.000035 to 0.99 and desorption isotherms were collected for p/p° of 0.99 to 0.15. It will be appreciated that with regards to p/p°, p is the equilibrium pressure and p° is the saturation vapor pressure at the adsorption temperature.

For TPD analyses, each sample was activated at 600° C. under helium followed by adsorption of ammonia at 180° C. It will be appreciated that ammonium is the adsorbate. The ammonia uptake was recorded and is indicative of acid sites. The ammonia-adsorbed zeolites were subsequently purged under helium for 4 hours to minimize the extent of ammonia physisorption. Finally, the TPD spectra were recorded by heating the samples from 180 to 600° C. at a rate of 15° C./min under helium flow. The temperature with the peak TPD signal was noted a $T_{max}$.

TABLE 1

| Template | Physisorption and Temperature-Programmed Desorption Data | | | | | | |
|---|---|---|---|---|---|---|---|
| | BET Surface Area $(m^2/g)^2$ | Center of Pore Width Distribution (nm) | Micropore Volume $(cm^3/g)$ | Total Pore Volume $(cm^3/g)$ | Mesopore volume $(cm^3/g)$ | $T_{max}$ (° C.) | $NH_3$ uptake (mmol $NH_3/g$) |
| Comparative Example 13 (None) | 499.9 | N/A | 0.242 | 0.321 | 0.079 | 337 | 0.510 |
| without functionalization step | | | | | | | |
| Inventive Example 1 (Template 1) | 416.3 | 3.1 | 0.163 | 0.357 | 0.194 | 331 | 0.452 |
| Inventive Example 2 (Template 2) | 437.8 | 4.5 | 0.149 | 0.412 | 0.263 | 332 | 0.474 |
| Inventive Example 3 (Template 3) | 395.7 | 4.9 | 0.107 | 0.413 | 0.306 | 327 | 0.390 |
| Inventive Example 4 (Template 4) | 511.8 | 2.5 | 0.157 | 0.392 | 0.235 | 329 | 0.466 |
| with functionalization step | | | | | | | |
| Comparative Example 5 (Template 1) | 427.7 | 3.1 | 0.170 | 0.357 | 0.188 | 326 | 0.446 |
| Comparative Example 6 (Template 2) | 415.2 | 4.5 | 0.143 | 0.433 | 0.291 | 327 | 0.478 |
| Comparative Example 7 (Template 3) | 448.0 | 4.8 | 0.110 | 0.478 | 0.368 | 330 | 0.436 |

TABLE 1-continued

Physisorption and Temperature-Programmed Desorption Data

| Template | BET Surface Area $(m^2/g)^2$ | Center of Pore Width Distribution (nm) | Micropore Volume $(cm^3/g)$ | Total Pore Volume $(cm^3/g)$ | Mesopore volume $(cm^3/g)$ | $T_{max}$ (°C.) | $NH_3$ uptake (mmol $NH_3/g$) |
|---|---|---|---|---|---|---|---|
| Comparative Example 8 (Template 4) | 449.2 | 2.5 | 0.142 | 0.363 | 0.221 | 332 | 0.474 |

The pore volumes indicated in Table 1 were calculated using the density functional theory (DFT) method. The DFT method is a modeling technique considered to be one of the most reliable methods to calculate pore sizes and volumes for porous materials. Additionally, the total pore volume was determined for pores in the range of 0 to 40 nanometers (nm). An upper limit of 40 nm excludes pores of such substantial size that they no longer may be considered a pore and functionally become a cavity in the mesoporous zeolite. Determination of mesopore pore volume was achieved by subtracting the micropore volume calculated in accordance with the DFT method from the total pore volume also calculated in accordance with the DFT method. Example characterization of porous materials using DFT methods is detailed in J. Landers, G. Y. Gor, A. V. Neimark, Colloids and Surfaces A: Physicochem. Eng. Aspects 437 (2013) 3-32.

Figure 7A:
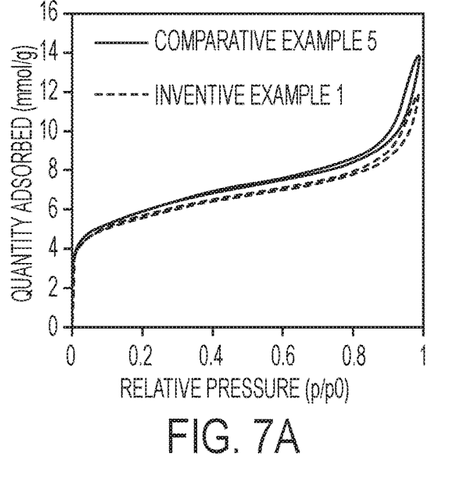
FIG. 7A is a graph of adsorption profiles for a comparative mesoporous zeolite formed with a discrete functionalization step and a mesoporous zeolite formed without a discrete functionalization step according to one or more embodiments shown and described herein.
Figure 7B:
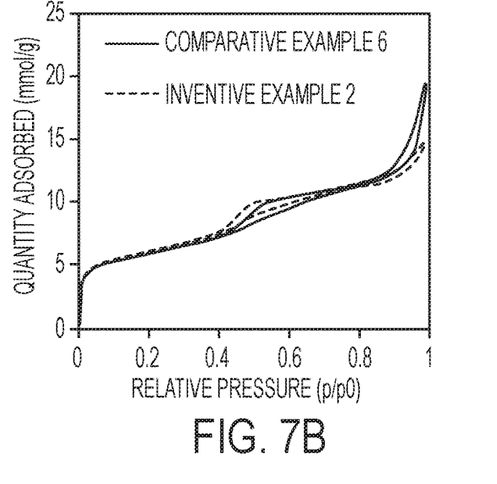
FIG. 7B is a graph of adsorption profiles for a comparative mesoporous zeolite formed with a discrete functionalization step and a mesoporous zeolite formed without a discrete functionalization step according to one or more embodiments shown and described herein.
Figure 7C:
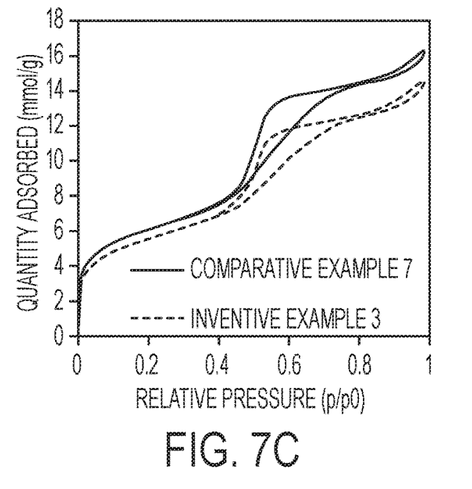
FIG. 7C is a graph of adsorption profiles for a comparative mesoporous zeolite formed with a discrete functionalization step and a mesoporous zeolite formed without a discrete functionalization step according to one or more embodiments shown and described herein.
Figure 7D:
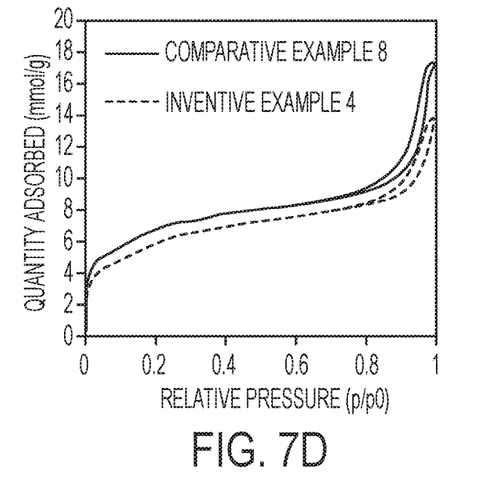
FIG. 7D is a graph of adsorption profiles for a comparative mesoporous zeolite formed with a discrete functionalization step and a mesoporous zeolite formed without a discrete functionalization step according to one or more embodiments shown and described herein.

With reference to FIGS. 7A-7D, the quantity of argon adsorbed as a function of relative pressure is provided for each of Inventive Examples 1-4 and Comparative Examples 5-8. FIG. 7A provides a comparison of the adsorption curves for Inventive Example 1 (Template 1, no functionalization step) and Comparative Example 5 (Template 1, with functionalization step). FIG. 7B provides a comparison of the adsorption curves for Inventive Example 2 (Template 2, no functionalization step) and Comparative Example 6 (Template 2, with functionalization step). FIG. 7C provides a comparison of the adsorption curves for Inventive Example 3 (Template 3, no functionalization step) and Comparative Example 7 (Template 3, with functionalization step). FIG. 7D provides a comparison of the adsorption curves for Inventive Example 4 (Template 4, no functionalization step) and Comparative Example 8 (Template 4, with functionalization step. It is noted that in each of FIGS. 7A-7D, the Inventive Example and the Comparative Example maintain similar adsorption curves indicating minimal effect on adsorption when a discrete functionalization step is included or a discrete functionalization step is omitted. Each of FIGS. 7A-7D include two lines for each sample as during testing the relative pressure is first increased and then decreased yielding two lines. One line for each sample is the adsorption branch and the other is the desorption branch.

Figure 8A:
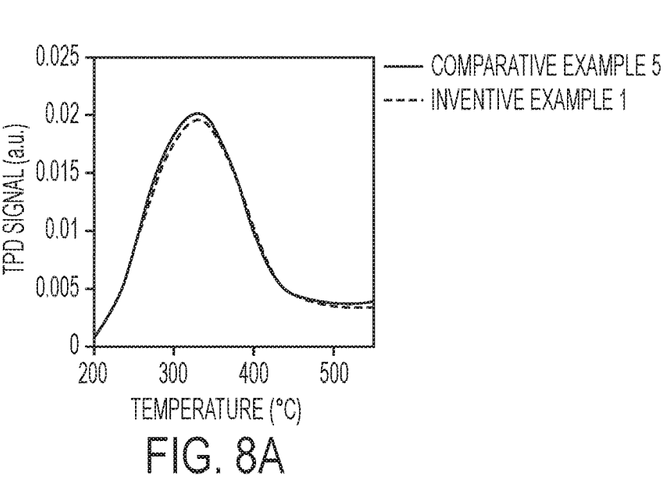
FIG. 8A is a graph of temperature-programmed desorption (TPD) signal return profiles for a comparative mesoporous zeolite formed with a discrete functionalization step and a mesoporous zeolite formed without a discrete functionalization step according to one or more embodiments shown and described herein.
Figure 8B:
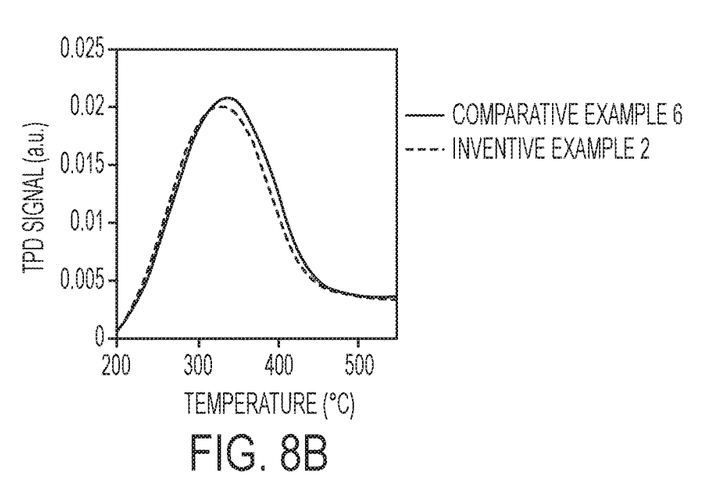
FIG. 8B is a graph of temperature-programmed desorption (TPD) signal return profiles for a comparative mesoporous zeolite formed with a discrete functionalization step and a mesoporous zeolite formed without a discrete functionalization step according to one or more embodiments shown and described herein.
Figure 8C:
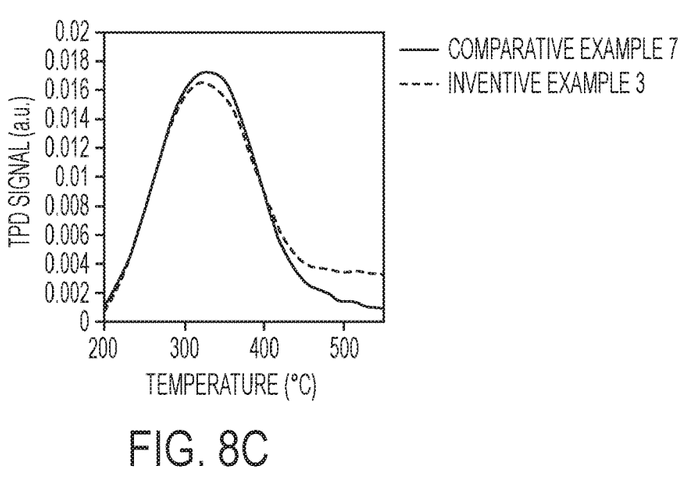
FIG. 8C is a graph of temperature-programmed desorption (TPD) signal return profiles for a comparative mesoporous zeolite formed with a discrete functionalization step and a mesoporous zeolite formed without a discrete functionalization step according to one or more embodiments shown and described herein.
Figure 8D:
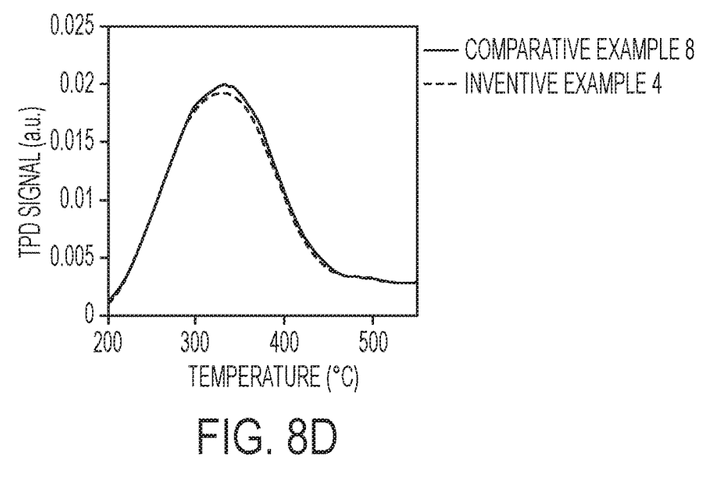
FIG. 8D is a graph of temperature-programmed desorption (TPD) signal return profiles for a comparative mesoporous zeolite formed with a discrete functionalization step and a mesoporous zeolite formed without a discrete functionalization step according to one or more embodiments shown and described herein.

With reference to FIGS. 8A-8D, the TPD signal as a function of desorption temperature is provided for each of Inventive Examples 1-4 and Comparative Examples 5-8. Specifically, FIG. 8A provides a comparison of the TPD signal for Inventive Example 1 (Template 1, no functionalization step) and Comparative Example 5 (Template 1, with functionalization step). FIG. 8B provides a comparison of the TPD signal for Inventive Example 2 (Template 2, no functionalization step) and Comparative Example 6 (Template 2, with functionalization step). FIG. 8C provides a comparison of the TPD signal for Inventive Example 3 (Template 3, no functionalization step) and Comparative Example 7 (Template 3, with functionalization step). FIG. 8D provides a comparison of the TPD signal for Inventive Example 4 (Template 4, no functionalization step) and Comparative Example 8 (Template 4, with functionalization step). The peak of each graph indicates the temperature at which the ammonia desorbs. The higher the temperature required for desorption, the stronger the acid sites. The area under each peak indicates how much ammonia desorbs, indicating how many acid sites each zeolite contains. It is noted that in each of FIGS. 8A-8D, the Inventive Example and the Comparative Example maintain similar TPD signal indicating minimal effect in binding energy when a discrete functionalization step is included or a discrete functionalization step is omitted. Given the minimal difference between each inventive example and its corresponding comparative example, it may be reasoned that removal of the functionalization step has little or no effect on acid site strength or concentration.

The inventive examples and comparative examples characterized in Table 1 provide a demonstration of the ability to generate mesoporous zeolites without a discrete functionalization step while avoiding adverse effects to the physical properties of the resulting mesoporous zeolite. Specifically, the BET surface area of mesorpoprous zeolites formed with a functionalization step and without a functionalization step are similar with a slight increase in BET surface area with the functionalization step for some organosilane mesopore templates (template 1 and 3) and a slight decrease in BET surface area with the functionalization step for some organosilane mesopore templates (template 2 and 4). Similarly, the mesopore volume of mesoporous zeolites formed with a functionalization step and without a functionalization step are similar with a slight increase in mesopore volume with the functionalization step for some organosilane mesopore templates (template 2 and 3) and a slight decrease in mesopore volume with the functionalization step for some organosilane mesopore templates (template 1 and 4). It is further noted that the center of pore width distribution remains substantially the same between the mesoporous zeolites formed with and without the discrete functionalization step.

It should be understood that the various aspects of the method of forming mesoporous zeolites with tunable physical properties are described and such aspects may be utilized in conjunction with various other aspects.

In a first aspect, a method of forming mesoporous zeolites with tunable physical properties is provided. The method includes mixing a silicon-containing material, an aluminum-containing material, and at least a quaternary amine to produce a zeolite precursor solution; pre-crystallizing the zeolite precursor solution at a pre-crystallization temperature of greater than 125° C. and autogenous pressure to form a pre-crystallized zeolite precursor solution represented by the formation of an amorphous phase in pseudo-steady-state where solid and solution phases approach equilibrium and silicate and aluminosilicate anion distributions are established; combining two or more distinct organosilane mesopore templates with the pre-crystallized zeolite precursor solution to produce a zeolite precursor gel; crystallizing the zeolite precursor gel to produce a crystalline zeolite intermediate; and calcining the crystalline zeolite intermediate to produce the mesoporous zeolite.

A second aspect may include the first aspect wherein the crystalline zeolite intermediate is calcined by exposure to a temperature of at least 500° C.

A third aspect may include the first or second aspect, wherein the organosilane mesopore template comprises compounds in accordance with wherein wherein R is an aliphatic, aromatic, or heteroatom-containing group.

A fourth aspect may include the third aspect, wherein R is H, R is Ph, or R is CH═CHPh A fifth aspect may include any of the first to fourth aspects, wherein the silicon-containing material comprises SiO₂, sodium silicate, tetramethylsiloxane, tetraethylsiloxane, silicon salt, silicon alkoxide, or combinations thereof.

A sixth aspect may include any of the first to fifth aspects, wherein the aluminum-containing material comprises aluminum nitrate, aluminum sulfate, aluminum alkoxide, other aluminum salts, or combinations thereof.

A seventh aspect may include any of the first to sixth aspects, wherein the mesoporous zeolite comprises an MFI framework type, a FAU framework type, an MOR framework type, or a BEA framework type.

An eighth aspect may include any of the first to sixth aspects, wherein the mesoporous zeolite comprises a Beta zeolite.

A ninth aspect may include any of the first to eighth aspects, wherein the quaternary amine comprises tetraethylammonium hydroxide, tetraethylammonium alkoxide, tetrapropylammonium alkoxide, other alkaline materials comprising ammonium, or combinations thereof.

A tenth aspect may include any of the first to ninth aspects, wherein the quaternary amine comprises tetraethylammonium hydroxide.

An eleventh aspect may include any of the first to tenth aspects, wherein the organosilane mesopore template has a total loading of 0.5 mol % to 25 mol % with respect to the silicon-containing material.

A twelfth aspect may include any of the first to eleventh aspects, wherein the crystallization is completed at a crystallization temperature greater than 140° C.

In a thirteenth aspect, an organosilane mesopore template is provided. The organosilane mesopore template includes a structure in accordance with wherein R is an aliphatic, aromatic, or heteroatom-containing group.

A fourteenth aspect may include the thirteenth aspect, wherein R is H.

A fifteenth aspect may include the thirteenth aspect, wherein R is a phenyl (Ph) group.

A sixteenth aspect may include the thirteenth aspect, wherein R is CH═CHPh.

In a seventeenth aspect, a method of forming an organosilane mesopore template comprising a structure in accordance with wherein R is an aliphatic, aromatic, or heteroatom-containing group is provided. The method includes combining one equivalent of an aniline derivative with 1 to 1.5 equivalents of 3-glycidoxypropyltrimethoxysilane in the presence of ethanol to form a reaction mixture stirring and heating the reaction mixture, wherein the aniline derivative comprises a structure in accordance with An eighteenth aspect may include the seventeenth aspect, wherein the stirring and heating the reaction mixture is completed in a Schlenk flask by stirring the reaction mixture at reflux for 4 to 24 hours.

A nineteenth aspect may include the seventeenth aspect, wherein the stirring and heating the reaction mixture is completed in a sealed vessel by stirring the reaction mixture at 130 to 220° C. for 5 to 90 minutes.

A twentieth aspect may include the eighteenth or nineteenth aspect, wherein R is H, R is a phenyl group (Ph), or R is CH═CHPh.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A method of forming mesoporous zeolites with tunable physical properties, the method comprising:
   mixing a silicon-containing material, an aluminum-containing material, and at least a quaternary amine to produce a zeolite precursor solution;
   pre-crystallizing the zeolite precursor solution at a pre-crystallization temperature of greater than 125° C. and autogenous pressure to form a pre-crystallized zeolite precursor solution represented by the formation of an amorphous phase in pseudo-steady-state where solid and solution phases approach equilibrium and silicate and aluminosilicate anion distributions are established;
   combining an organosilane mesopore template with the pre-crystallized zeolite precursor solution to produce a zeolite precursor gel, wherein the organosilane mesopore template comprises compounds in accordance with wherein R is an aliphatic, aromatic, or heteroatom-containing group;
   crystallizing the zeolite precursor gel to produce a crystalline zeolite intermediate; and
   calcining the crystalline zeolite intermediate to produce the mesoporous zeolite,
   wherein the method does not comprise a discrete functionalization step of the zeolite precursor gel before crystallizing the zeolite precursor gel wherein the mesoporous zeolite comprises a BEA framework type.

2. The method of claim 1, wherein the crystalline zeolite intermediate is calcined by exposure to a temperature of at least 500° C.

3. The method of claim 1, wherein R is H, R is Ph, or R is CH=CHPh.

4. The method of claim 1, wherein the silicon-containing material comprises $SiO_2$, sodium silicate, tetramethylsiloxane, tetraethylsiloxane, silicon salt, silicon alkoxide, or combinations thereof.

5. The method of claim 1, wherein the aluminum-containing material comprises aluminum nitrate, aluminum sulfate, aluminum alkoxide, other aluminum salts, or combinations thereof.

6. The method of claim 1, wherein the mesoporous zeolite comprises a Beta zeolite.

7. The method of claim 1, wherein the quaternary amine comprises tetraethylammonium hydroxide, tetraethylammonium alkoxide, tetrapropylammonium alkoxide, other alkaline materials comprising ammonium, or combinations thereof.

8. The method of claim 1, wherein the quaternary amine comprises tetraethylammonium hydroxide.

9. The method of claim 1, wherein the organosilane mesopore template has a total loading of 0.5 mol % to 25 mol % with respect to the silicon-containing material.

10. The method of claim 1, wherein the crystallization is completed at a crystallization temperature greater than 140° C.

11. A method of forming an organosilane mesopore template comprising a structure in accordance with, wherein R is an aliphatic, aromatic, or heteroatom-containing group, the method comprising:
    combining one equivalent of an aniline derivative with 1 to 1.5 equivalents of 3-glycidoxypropyltrimethoxysilane in the presence of ethanol to form a reaction mixture; and
    stirring and heating the reaction mixture; wherein the aniline derivative comprises a structure in accordance with and the stirring and heating the reaction mixture is in accordance with I or II:
    I. the stirring and heating the reaction mixture is completed in a Schlenk flask by stirring the reaction mixture at reflux for 4 to 24 hours; or
    II. the stirring and heating the reaction mixture is completed in a sealed vessel by stirring the reaction mixture at 130 to 220° C. for 5 to 90 minutes.

12. The method of claim 11, wherein R is H, R is a phenyl group (Ph), or R is CH=CHPh.

* * * * *